(12) United States Patent
Zheng et al.

(10) Patent No.: US 8,804,475 B1
(45) Date of Patent: *Aug. 12, 2014

(54) PLANT GAIN CALIBRATION FOR AN OPTICAL STORAGE SERVO SYSTEM

(71) Applicant: Marvell International Ltd., Hamilton (BM)

(72) Inventors: Yuan Zheng, Fremont, CA (US); Alex Chiang, Taipei (TW); Enya Cheng, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,648

(22) Filed: Sep. 9, 2013

Related U.S. Application Data

(63) Continuation of application No. 13/591,499, filed on Aug. 22, 2012, now Pat. No. 8,531,935, which is a continuation of application No. 13/171,305, filed on Jun. 28, 2011, now Pat. No. 8,259,542, which is a continuation of application No. 12/192,896, filed on Aug. 15, 2008, now Pat. No. 7,974,160.

(60) Provisional application No. 60/955,935, filed on Aug. 15, 2007.

(51) Int. Cl.
*G11B 7/00* (2006.01)
*G11B 15/02* (2006.01)

(52) U.S. Cl.
USPC .................................... 369/124.1; 369/47.25

(58) Field of Classification Search
CPC .. G11B 7/0901; G11B 7/094; G11B 7/08541; G11B 7/08529
USPC .......... 369/44.27, 44.28, 44.34, 44.29, 44.35, 369/47.1, 47.53, 124.01, 44.36, 124.1, 369/47.25

See application file for complete search history.

(56) References Cited

U.S. PATENT DOCUMENTS

| | | | |
|---|---|---|---|
| 4,195,337 A | 3/1980 | Bertrand et al. | |
| 5,220,546 A | 6/1993 | Fennema | |
| 5,959,952 A | 9/1999 | Wakuda | |
| 6,700,388 B1 | 3/2004 | Mayor et al. | |
| 7,064,918 B1 | 6/2006 | Codilian et al. | |
| 7,136,257 B2 | 11/2006 | Zhang et al. | |
| 7,423,837 B2 | 9/2008 | Hutsell | |
| 7,474,496 B1 | 1/2009 | Sun et al. | |
| 7,595,957 B2 | 9/2009 | Liu et al. | |
| 7,821,908 B2 | 10/2010 | Sugaya et al. | |
| 7,953,502 B2 | 5/2011 | Takaishi | |

*Primary Examiner* — Nabil Hindi

(57) ABSTRACT

Aspects of the disclosure provide a method for calibrating gains of an optical storage servo system having a plant. The method includes translating a first signal of the plant from a time domain effort signal into a frequency domain effort signal, translating a second signal of the plant from a time domain error signal into a frequency domain error signal, determining a first gain of the optical storage servo system based on the first signal and the second signal, comparing a third signal from an optical disk of the optical storage servo system with a predetermined threshold, and asserting a defect flag when the third signal drops below the predetermined threshold to avoid calibrating the first gain based on the first signal and the second signal.

20 Claims, 10 Drawing Sheets

PLANT GAIN CALIBRATION FOR AN OPTICAL STORAGE SERVO SYSTEM

CROSS REFERENCE TO RELATED APPLICATION

This disclosure is a continuation of U.S. application Ser. No. 13/591,499, filed on Aug. 22, 2012, now issued as U.S. Pat. No. 8,531,935, which is a continuation of U.S. application Ser. No. 13/171,305, filed on Jun. 28, 2011, now issued as U.S. Pat. No. 8,259,542. which is a continuation of U.S. application Ser. No. 12/192,896, filed on Aug. 15, 2008, now issued as U.S. Pat. No. 7,974,160, which claims priority under 35 U.S.C. §119(e) to U.S. Provisional Application No. 60/955,935, filed on Aug. 15, 2007. The disclosures of the applications referenced above are incorporated herein by reference in their entireties.

BACKGROUND

1. Field of the Invention

The present invention relates generally to optical storage systems, and more particularly to a gain calibration method for an optical storage servo system.

2. Description of Related Art

An optical storage servo system is used to control the positioning of an optical lens, so that a track on an optical disk will be positioned accurately beneath the lens. In contrast to a hard disk drive, an optical storage system uses removable media. As a result, both a loader for the disk, and the disk itself, may introduce disturbances during operation of the optical storage system. An optical storage servo system may have several feedback control loops, such as a focus loop and a radial loop, to achieve high performance and robustness against OPU (optical pickup unit) actuator variations and other mechanical disturbances coming from disks or an actuating mechanism.

FIG. 1 illustrates an example of a simplified servo feedback loop for an optical storage system. As shown, the loop may have a dynamic plant P and a compensator C. The plant P may have an actuator $P_1$ and a sensor $P_2$. As a result:

$$P = P_1 \cdot P_2 \quad (1)$$

The actuator $P_1$ may include a digital/analog converter (D/A), a motor driver circuit, and a VCM (Voice Coil Motor) in an OPU/loader. Since optical storage systems use low cost motors, each loader may have a different actuator gain $K_2$ and may introduce disturbances or uncertainty. The sensor $P_2$ may include an optical photo diode, and a servo signal generator module in firmware. The sensor $P_2$ may detect an error signal between the OPU's actual position and a target position, and may have different gains $K_1$ and introduce plant uncertainties. The sensor gain $K_1$ may include a focus sensor gain and a radial sensor gain. The compensator (or controller) C may receive the output of the sensor, as a servo signal, and generate a control effort to drive the actuator and suppress the disturbances or uncertainty. The compensator C may be a control IIR (Infinite Impulse Response) filter implemented in firmware. The open loop transfer function of the servo feedback loop shown in FIG. 1 is as follows:

$$L = C \cdot K_1 \cdot K_2 \cdot P_1 \cdot P_2 \quad (2)$$

where $K_1$ represents a sensor gain, $K_2$ represents an actuator gain, C represents a compensator, $P_1$ represents the actuator, and $P_2$ represents the sensor.

The gain calibration for an optical storage servo system may include calibration of the actuator gain $K_2$ and the sensor gain $K_1$. Since there are big gain variations in inexpensive optical storage systems, it is very difficult to accurately measure the actuator gain $K_2$ in open loop settings. Currently available technologies use Loop Gain Calibration (LGC) in closed loop operation to calibrate the actuator gain $K_2$ by measuring either the magnitude or the phase of the transfer function (2), as shown in FIGS. 2A and 2B.

The curve for magnitude measurement is shown in FIG. 2A. A fixed frequency sine wave may be injected into the servo feedback loop shown in FIG. 1 at point A as a reference signal. The frequency of the sine wave may be the zero dB cross-over frequency determined by the compensator C. The magnitude of the transfer function (2) may be measured at point B. Since the target is zero dB or 1, the actuator gain $K_2$ is the inverse of the loop magnitude measurement at the cross-over frequency.

The curve for phase measurement is shown in FIG. 2B. A fixed frequency, fixed magnitude sine wave may be injected into the servo feedback loop shown in FIG. 1 at point A as a reference signal, and the phase difference between the servo error signal at point B and the injected sine wave may be obtained. The sine wave may be, for example, 1.36 kHz. The phase difference may be compared with a target. A trial-and-error method may be used to make the phase difference to approach the target, so as to search for the actuator gain $K_2$. One problem of the phase detection based LGC is that it suffers from defective disks, since it is difficult to implement a defect protection scheme when using the try-and-error method.

Currently available technologies use an open loop sensor peak-to-peak measurement to calibrate the sensor gain $K_1$. In focus sensor gain calibration, an open loop focus ramp may be performed so that the peak-to-peak value of a focus error S-curve signal may be measured and compared with a target value. The S-curve peak-to-peak value is shown in FIG. 3 as the "pFocusError." Similarly, the radial sensor gain may be calibrated by measuring the peak-to-peak value of a radial error signal in a radial open loop. One problem is that the method can only be used with single layer disk servo systems, e.g., CDs or single layer DVDs. However, multilayer format optical systems, e.g., red laser DVDs, blue laser BDs and HD-DVDs, are becoming popular, and the focus sensor gain $K_1$ at inner layers may have a different S-curve than that of the outermost layer. Accordingly, the sensor gain $K_1$ cannot be accurately calibrated at inner layers with the currently available technology.

In addition, the currently available technologies assume that the compensator C is fixed, and therefore include the compensator C in the path from point A to B and calibrate the loop gain of the optical servo system. The currently available technologies also assume that the variation of the actuator gain $K_2$ is the same as that of the transfer function (2) since the compensator C is constant and the sensor gain $K_1$ can be calibrated very accurately by the open loop sensor peak-to-peak measurement. However, in some optical storage servo systems, the spindle speed may depend on disk conditions, and a particular compensator C may be provided for each spindle speed. When the frequency of the injected sine wave stays the same, if C changes, the zero crossing point may move and may affect the calibration of the actuator gain $K_2$.

Therefore, it may be desirable to provide a method to improve the calibration of the optical storage servo system.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a gain calibration method for optical storage servo systems. Instead of loop gain calibration, the method of the present invention uses plant gain calibration by injecting a reference sine wave r into an optical storage servo system, obtaining an effort signal m at the input of the servo plant and an error signal y at the output of the servo plant, using a DFT (Discrete Fourier Transform) to translate the time domain signals m and y into frequency responses M and Y, calculating a Y-to-M ratio, and using the magnitude of the Y-to-M ratio as the plant gain K of the servo system. The servo system's sensor gain $K_1$ at the outermost layer of a disk may be calibrated by, e.g., the conventional peak-to-peak measurement. Since $K=K_1 \cdot K_2$, the servo system's actuator gain $K_2$ at the outermost layer of the disk may be obtained. Because the actuator gain $K_2$ is the same for all layers of a disk, the variation of the sensor gain $K_1$ at an inner layer may follow that of the plant gain K at that layer. Accordingly, the sensor gain $K_1$ may be calibrated for each layer of a multilayer disk, and the calibration is independent from the compensator C. The method may be used with signal layer optical disks and multilayer optical disks. Advantages of the present invention will become apparent from the following detailed description.

Figure 1:
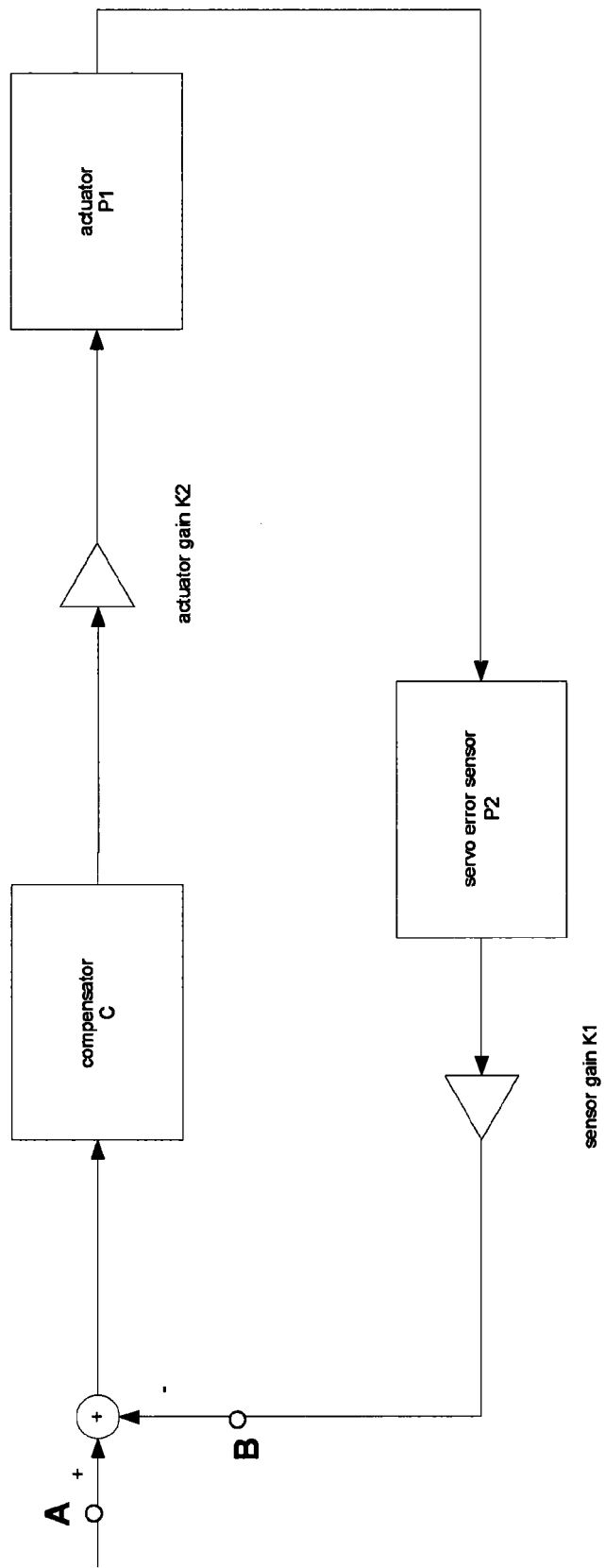
FIG. 1 illustrates an example of a simplified servo feedback loop for an optical storage system.
Figures 2A, 2B:
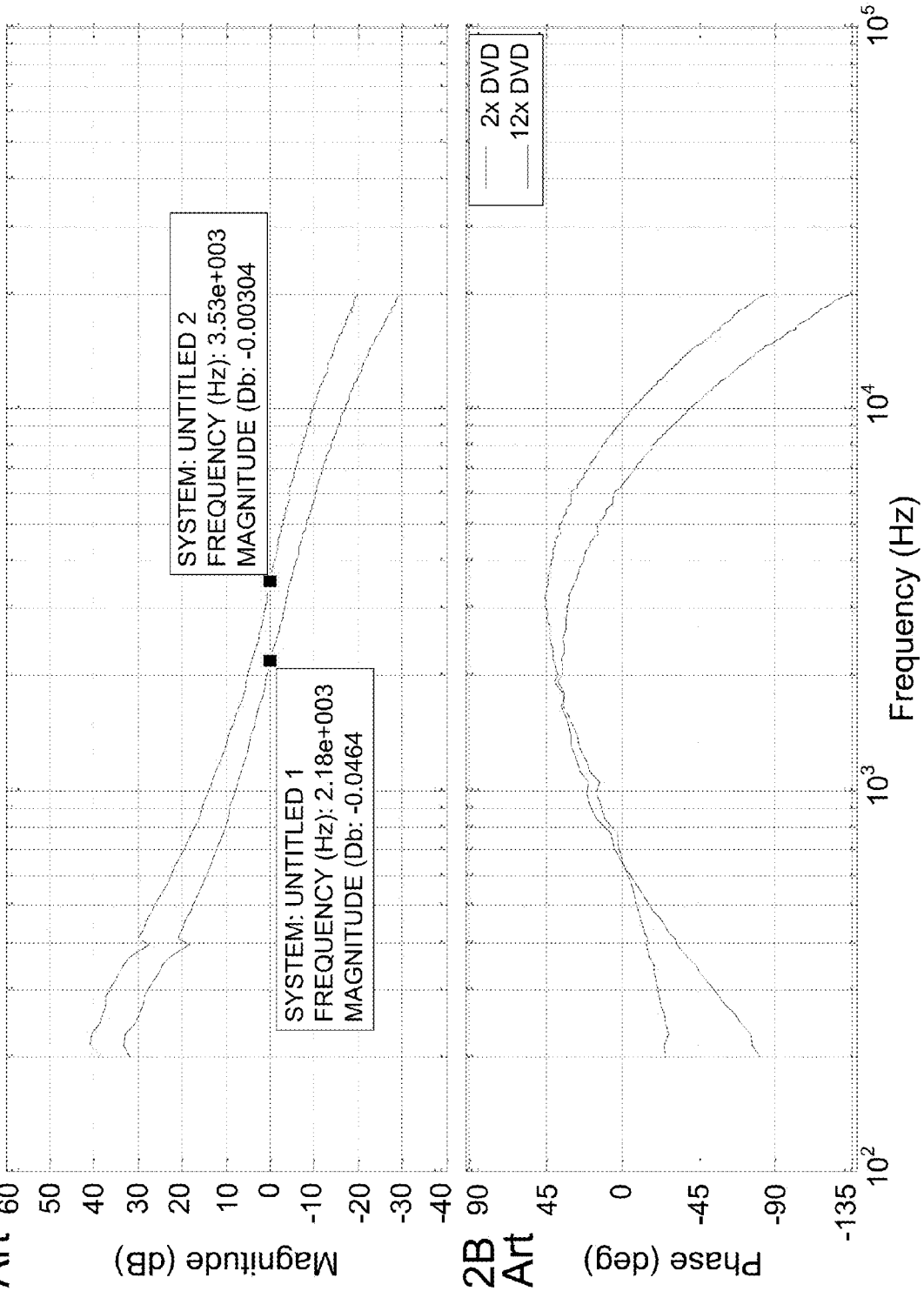
FIG. 2A illustrates an exemplary curve of magnitude measurements obtained by using LGC.
FIG. 2B illustrates an exemplary curve of phase measurements obtained by using LGC.
Figure 3:
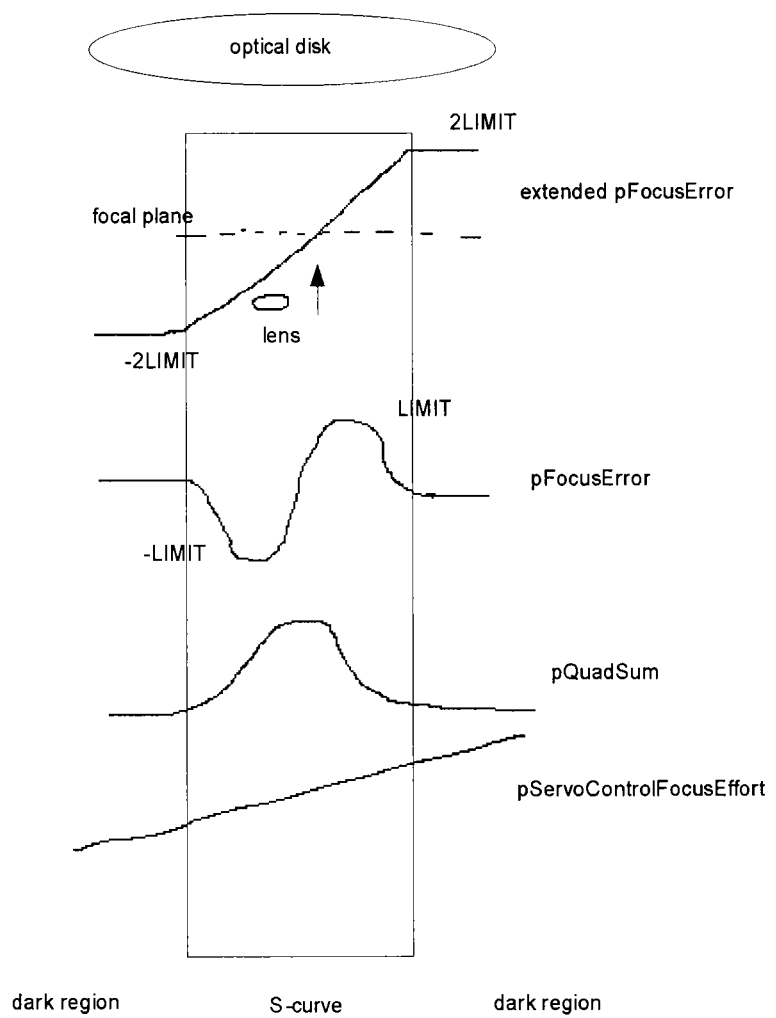
FIG. 3 illustrates an exemplary S-curve obtained in an open loop sensor peak-to-peak measurement for calibrating a sensor gain.
Figure 4:
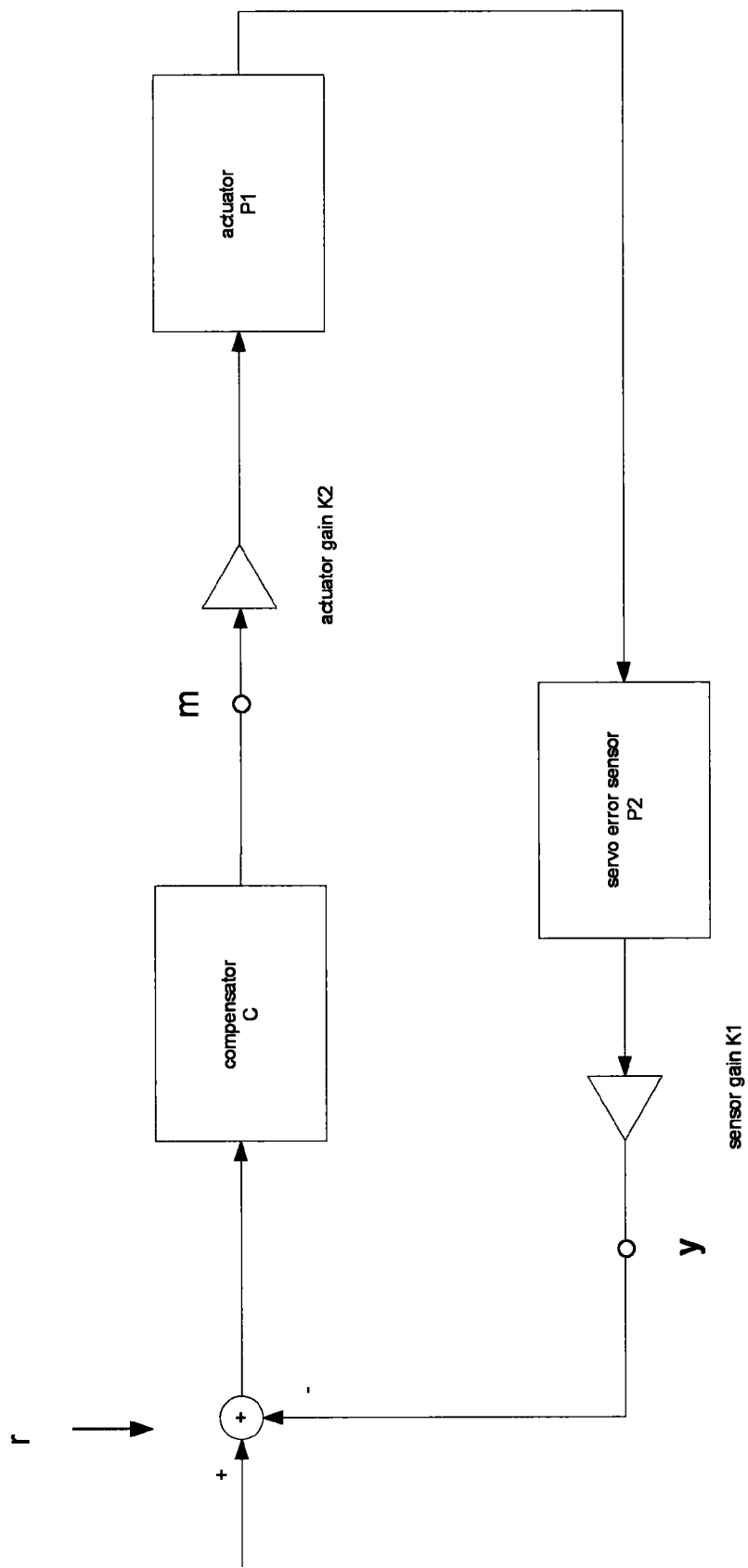
FIG. 4 illustrates signals used in plant gain calibration (PGC) for an optical storage servo system according to one embodiment of the present invention.

FIG. 4 illustrates signals used in plant gain calibration for an optical storage servo system according to one embodiment of the present invention. As shown, a reference sine wave signal r may be injected into the servo system. A time domain response at the input m of the servo plant may be used as an effort signal, and a time domain response at the output y of the servo plant may be used as an error signal. Signals m and y may be used for the PGC of the present application.

Figure 5:
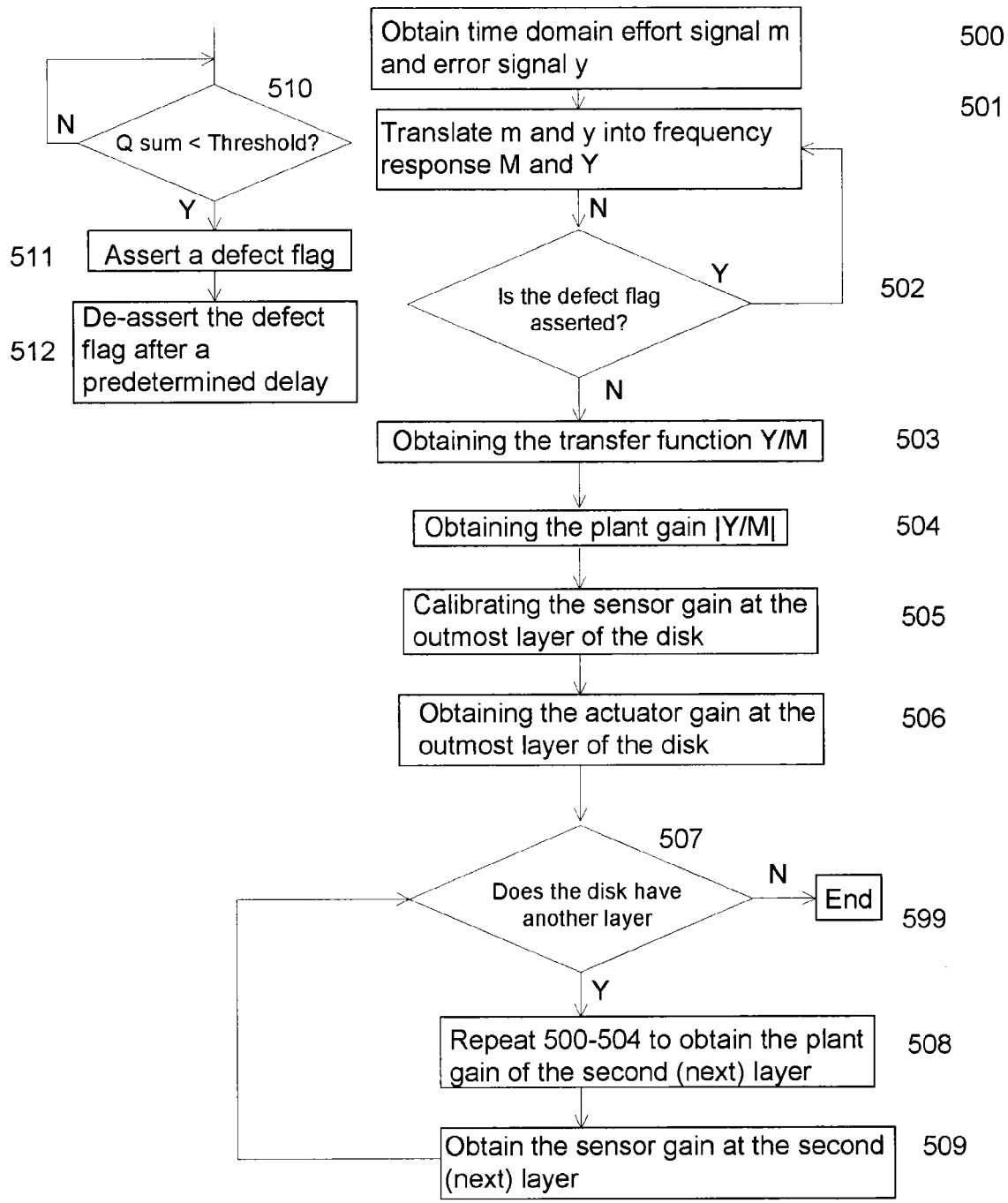
FIG. 5 is a flow chart of a method of plant gain calibration for an optical storage servo system according to one embodiment of the present invention.

FIG. 5 is a flow chart of a method of plant gain calibration for an optical storage servo system according to one embodiment of the present invention. The method may be used in the optical storage servo system shown in FIG. 4.

Figure 7:
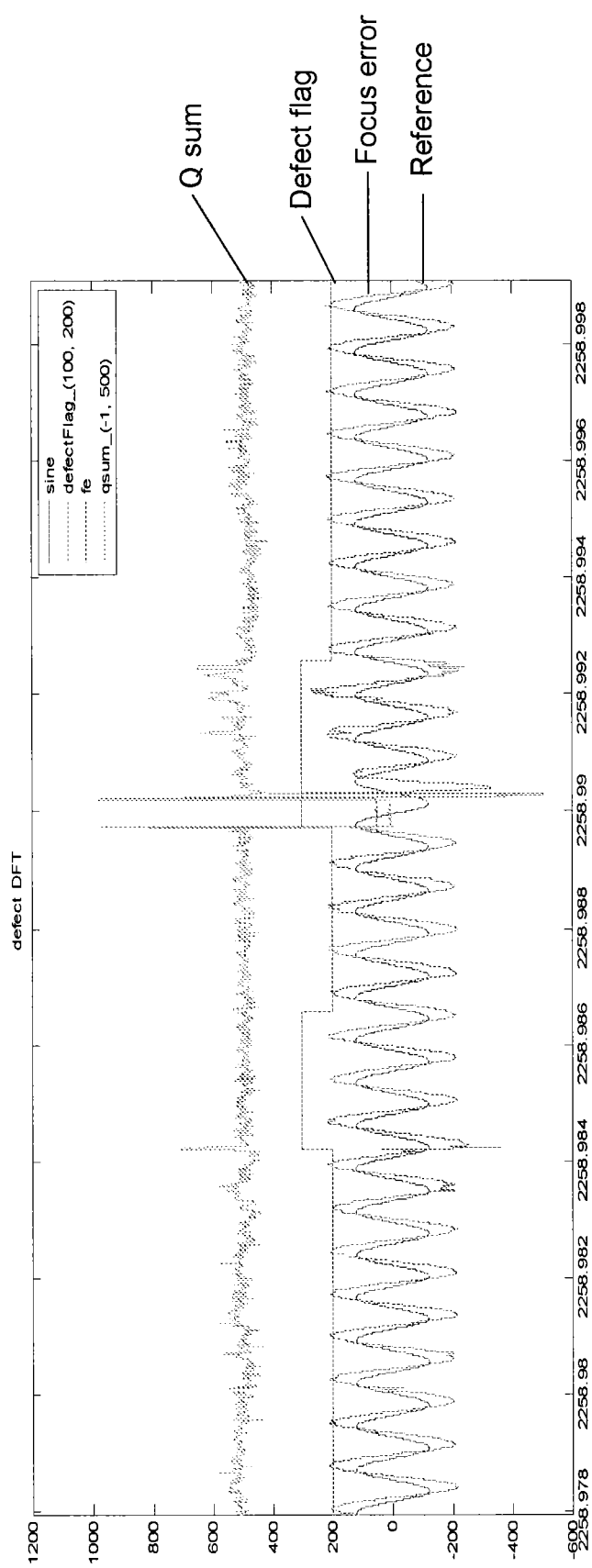
FIG. 7 illustrates exemplary waveforms for defect detection according to one embodiment of the present invention.

Removable media used in optical storage systems may have defects. A defect in an optical storage servo system means that a servo signal from a disk is damaged and cannot be used for feedback control. The defect may be, e.g., scratches, dots, or fingerprints. A large defect may be a challenge for the optical storage servo system. In terms of the strength of light reflected from a disk, e.g., $Q_{sum}$, there are two kinds of defects: black dots and bright dots. In the case of black dots, there is no reflection from the disc, and therefore the $Q_{sum}$ signal may drop. In addition, the $Q_{sum}$ signal may have transient at both start and end of defect, which may cause a spike. In FIG. 7, the second defect may be a black dot. In the case of bright dots, the disk surface may have manufacture problems, such as an air bubble, which may cause reflections from the disk high enough to distort the servo signal. In FIG. 7, the first defect may be a bright dot. A defect flag with a long delay may be used to mute the servo transient effect for a discrete-time Fourier transformation (DFT) engine. For the second defect in FIG. 7, the servo performance is not good during the long delay period. If the DFT engine is started, it may bring the PGC accuracy down.

At 510, it may be determined whether $Q_{sum}$ has dropped below a predetermined threshold.

If yes, at 511, a defect flag may be asserted, as shown in FIG. 7. The defect flag may be de-asserted (at 512) after a predetermined time delay, so as to return to normal track following.

Plant gain calibration may occur simultaneously with the defect detection. At 500, time domain responses to the reference signal r at the input m of the servo plant and the output y of the servo plant may be obtained, wherein m is an effort signal, and y is an error signal.

At 501, signals m and y may be translated from the time domain into the frequency domain and become frequency responses M and Y.

In one embodiment, a Fourier transform (phase and magnitude) of a servo plant at a particular frequency may be measured and the measurement may be compared with a target value. A continuous Fourier transform may be defined as follows:

$$V(f) = \int_{-\infty}^{\infty} v(t) e^{-j2\pi ft} dt \quad (3)$$

In one embodiment, a DFT may be used to approximate the continuous Fourier transform as follows:

$$V[k] = \sum_{n=0}^{N-1} v[k] e^{-j2\pi kn/N}, \ 0 \le k \le N-1 \quad (4)$$

wherein N is the number of samples.

Figure 6A:
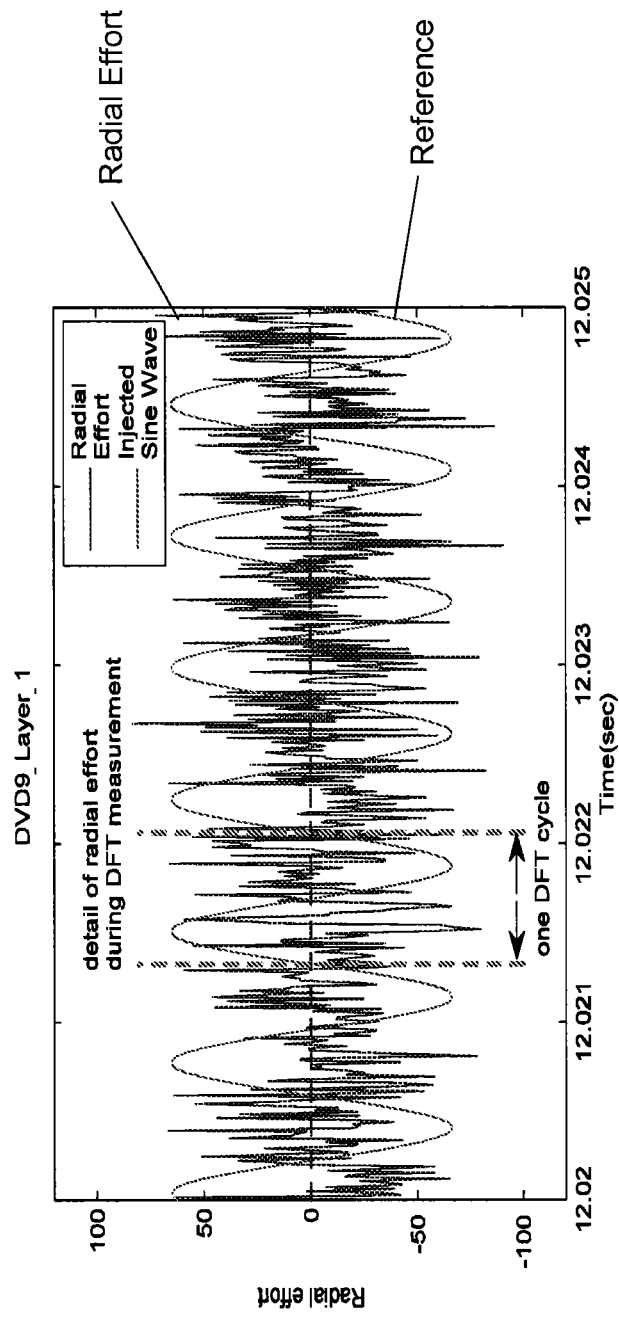
FIG. 6A illustrates an exemplary frequency response at the input of a servo plant according to one embodiment of the present invention.
Figure 6B:
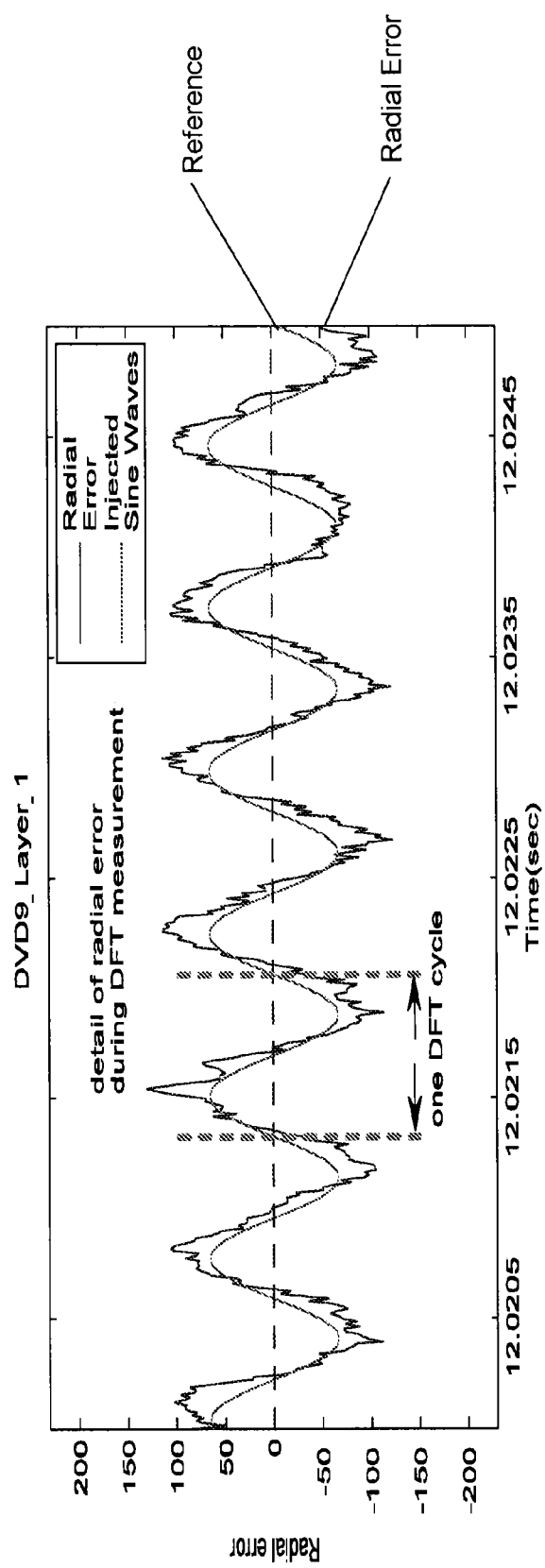
FIG. 6B illustrates an exemplary frequency response at the output of a servo plant according to one embodiment of the present invention.

The accuracy of the approximation may depend on the number of samples and the sampling frequency. In one embodiment, 96 sine waves at 1.36 kHz may be injected into the servo plant. By measuring the DFT of the servo plant output y and the DFT of the servo plant input m, the continuous Fourier transform of the servo plant (magnitude and phase) may be approximated. FIG. 6A illustrates an example of the reference signal r and its frequency response M, which is a radial effort signal. FIG. 6B illustrates an example of the reference signal r and its the frequency response Y, which is a radial error signal.

When the SNR (Signal-to-noise Ratio) is above a target level, one DFT session may be enough. One DFT session may be defined as one period of injected sine wave shown in FIGS. 6A and 6B. However, in order to overcome the large disturbances and noise in the closed loop system, PGC may need to have many DFT sessions to obtain a reliable and accurate plant gain result.

In the example shown in FIGS. 6A and 6B, one DFT cycle of the radial effort signal may include the following 64 values:
7 −30 −8 −19 −30 −22 −2 −15 −44 55 −35 14 13 −15 −27 −7 −55 −80 −67 −61 18 29 59 24 −8 −9 −33 −39 −66 −58 −22 15 4 12 54 −47 −18 −12 33 −21 29 9 −1 12 −4 15 3 −15 5 66 −35 −35 −18 37 −49 −5 −1 46 28 33 46 −46 55 −67

Thus, the frequency response M may be:

$$M=(45.4)+j(394.2)$$

In the example shown in FIGS. 6A and 6B, one DFT cycle of radial error signal may include the following 64 values:
−33 −13 −7 5 21 31 34 43 61 38 61 53 52 60 70 69 88 109 121 130 109 91 65 55 55 50 54 57 69 73 63 42 31 16 −14 1 −8 −15 −38 −34 −55 −62 −67 −76 −78 −87 −90 −85 −90 −114 −92 −81 −77 −90 −65 −65 −63 −76 −76 −79 −86 −55 −73 −32

Consequently, the frequency response Y may be:

$$Y=(-790.4)+j(-2845)$$

Before each DFT session, the defect flag may be checked at 502. If the defect flag is asserted, the procedure may go to the next DFT session, so as to discard signals from defect areas and avoid using signals from defect areas in calculating the plant gain.

At 503, a Y-to-M ratio, which is the plant transfer function L, may be determined. In one example, the plant transfer function L may be:

$$L = \frac{Y}{M} = \frac{(-790.4) + j(-2845)}{(45.4) + j(394.2)}$$

At 504, the magnitude of the plant transfer function L, which is the gain K of the dynamic servo plant at the outermost layer may be calculated. In one example, the magnitude may be:

$$K = \left|\frac{Y}{M}\right| =$$

$$\left|\frac{(-790.4) + j(-2845)}{(45.4) + j(394.2)}\right| = \frac{\sqrt{(-790.4)^2 + j(-2845)^2}}{\sqrt{(45.4)^2 + j(394.2)^2}} = \frac{2952.6}{396.8} = 7.44$$

At 505, the servo plant's sensor gain $K_1$ at the outermost layer of the disk may be calibrated, e.g., by the conventional peak-to-peak measurement.

As shown in the equation (1), the gain of the servo plant includes the actuator gain $K_2$ and the sensor gain $K_1$. When the servo plant's sensor gain $K_1$ at the outermost layer and the plant gain K are obtained at 505 and 504 respectively, the servo plant's actuator gain $K_2$ at the outermost layer of the disk may be determined at 506.

Since the actuator gain $K_2$ is the same for all layers of a disk, the variation of the sensor gain $K_1$ of an inner layer may follow that of the plant gain K at that layer. If it is determined at 507 that the disk has another layer, 500-504 may be performed at 508 to determine the servo plant's gain K at the second layer, and the sensor gain $K_1$ at the second layer may be calibrated at 509. 507-509 may be repeated for each layer of a multilayer disk.

Since signals at the input and output of the servo plant are used during the calibration, the PGC is independent of the compensator C. In addition, it is easier to implement a robust defect protection scheme during the PGC, so that the PGC result is accurate even for disks with various kinds of defects.

Figure 8:
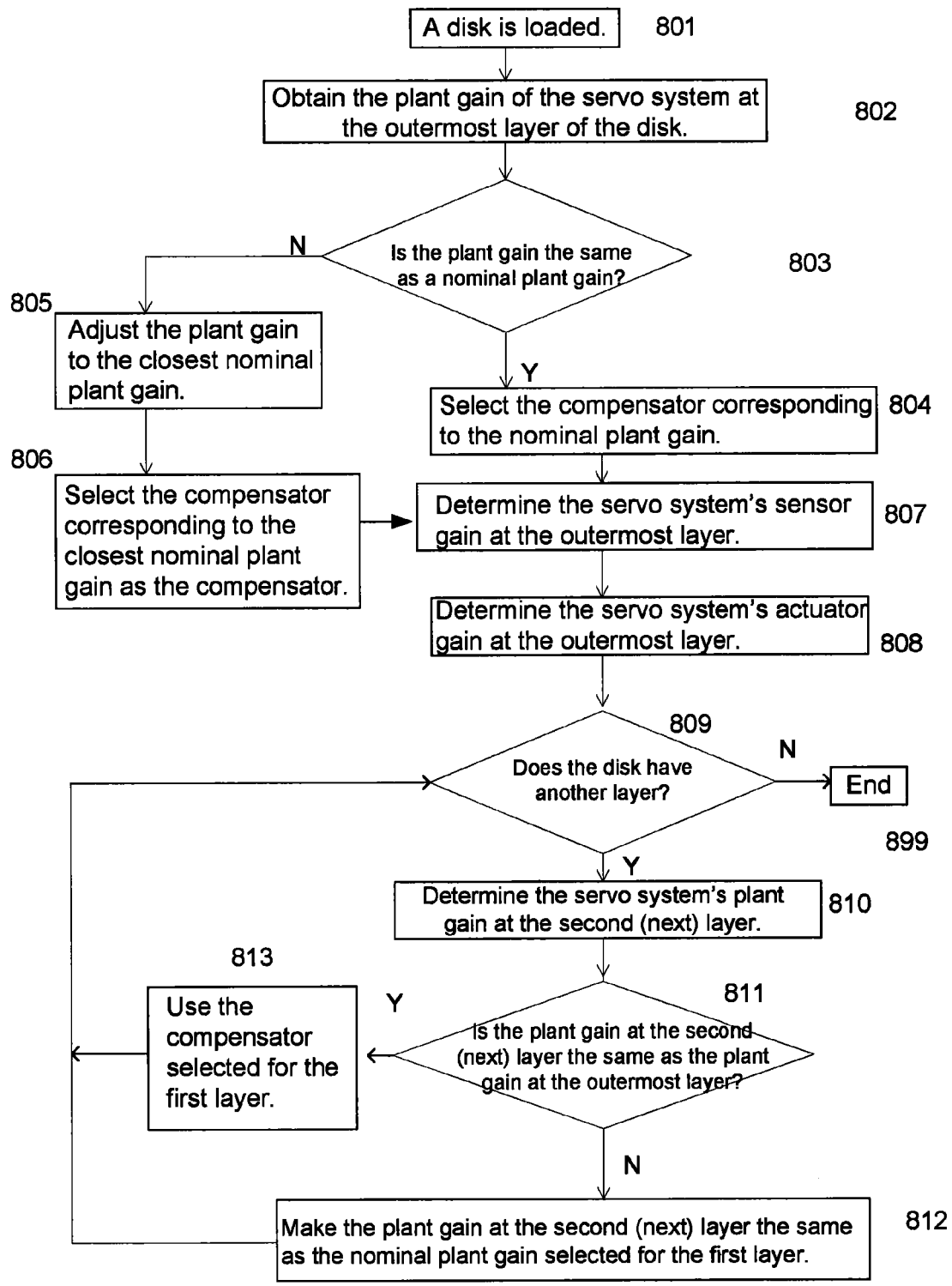
FIG. 8 is a flow chart of a method for controlling transfer function of an optical servo system according to one embodiment of the present invention.

FIG. 8 is a flow chart of a method for controlling the transfer function of an optical storage servo system according to one embodiment of the present invention. The method shown in FIG. 8 may be used in the optical storage servo system shown in FIG. 4, and may use part of the method shown in FIG. 5 to calibrate the plant gain of an optical storage servo system.

At 801, a disk may be loaded into an optical storage system.

At 802, the plant gain K at the outermost layer of the disk may be calibrated through 501 to 504.

At 803, it may be determined whether the plant gain K at the outermost layer equals one of a number of nominal plant gains $K_{nn}$ stored in a memory. The memory may also store a compensator $C_{nn}$ for each nominal plant gain $K_{nn}$. In one embodiment, a pair of nominal plant gain $K_{nn}$ and its corresponding compensator $C_{nn}$ may be stored for a family of disks, e.g., CD, DVD, and Blu-ray DVD, so that a compensator $C_{nn}$ may be used for the whole family of disks. A compensator $C_{nn}$ designed with a nominal plant gain $K_{nn}$ may deliver the same closed loop performance on different drives, even though there may be significant actuator and sensor variations.

If the plant gain K at the outermost layer equals a nominal plant gain $K_{n1}$, at 804, the compensator $C_{n1}$ corresponding to the nominal plant gain $K_{n1}$ may be selected as the compensator for the optical storage servo system, and the procedure may proceed to 807.

If the plant gain K at the outermost layer is different from all the stored nominal plant gains $K_{nn}$, the plant gain K at the outermost layer may be adjusted to a closest nominal gain, e.g., $K_{n2}$, at 805, and the compensator $C_{n2}$ corresponding to the closest nominal gain $K_{n2}$ may be selected for the optical storage servo system at 806 The procedure then may proceed to 807.

At 807, the sensor gain $K_1$ at the outermost layer of the disk may be calibrated by, e.g., the conventional peak-to-peak measurement. In one embodiment, a compensator $C_{n0}$, which may tolerate high disturbances and noise, may be used for the calibration.

At 808, the actuator gain $K_2$ at the outermost layer may be calculated.

At 809, it may be determined whether the disk has another layer. If not, the procedure may end at 899.

It the disk has a second layer, then at 810, the plant gain K at the second layer may be calculated through 501-504, and at 811, it may be determined whether the plant gain K at the second layer is the same as the plant gain at the outermost layer. If yes, $C_{n1}$ which corresponds to the nominal plant gain of the outermost layer $K_{n1}$ may be selected for the second layer at 812, and the procedure may return to 809.

If the plant gain K at the second layer is different from that of the outermost layer, then at 813, the plant gain K at the second layer may be adjusted to equal the plant gain K at the outermost layer, so that the compensator $C_{n1}$ selected for the outermost layer may be used for the second layer as well. The procedure may then return to 809.

In one embodiment, at 813, instead of adjusting the plant gain K at the second layer, a compensator $C_{nn}$ corresponding to a nominal plant gain which equals or is the closest to the plant gain at the second layer may be selected for the second layer.

Since the compensator C may be selected according to the plant gain of the optical storage servo system, the performance of the optical storage servo system may be significant improved.

Figure 9:
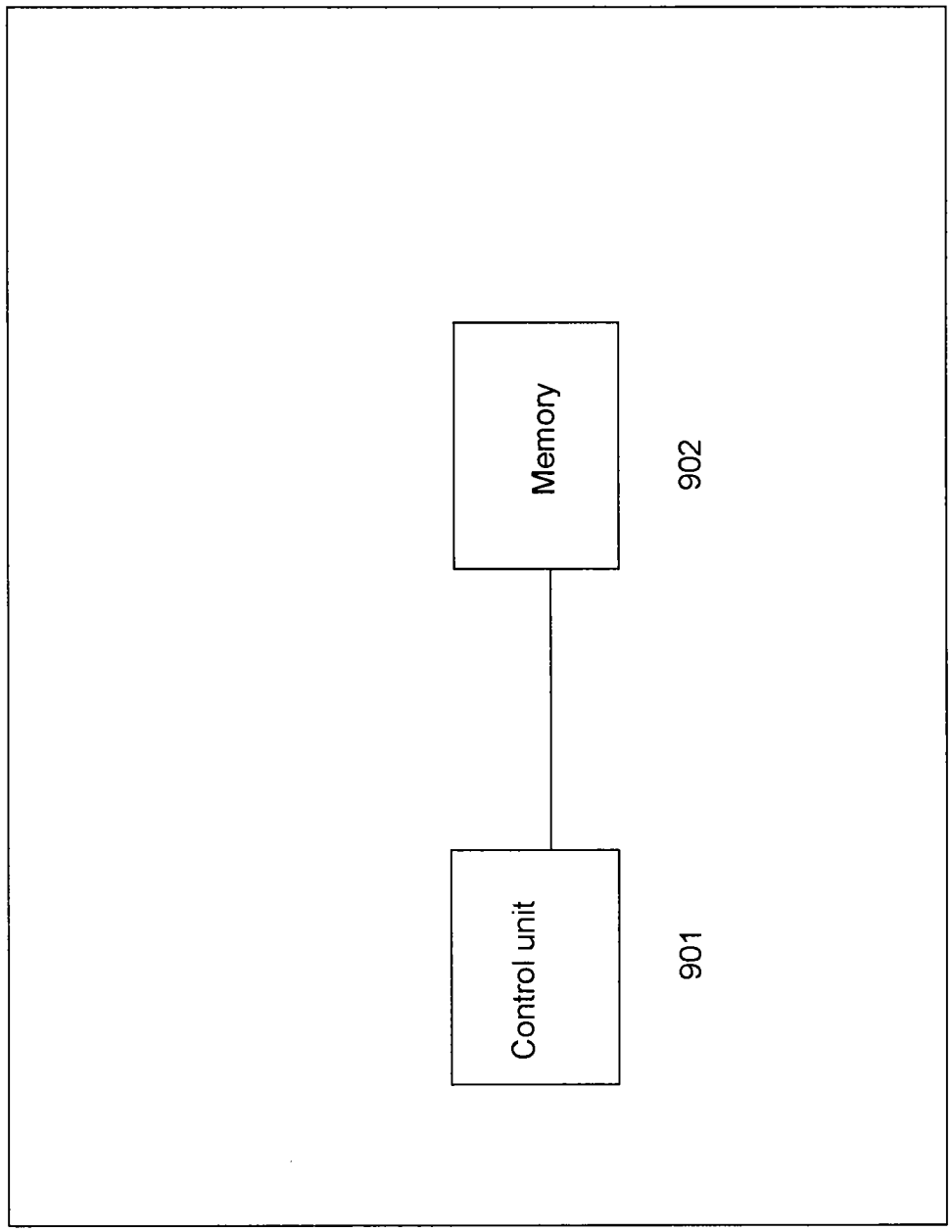
FIG. 9 illustrates a block diagram of an apparatus for controlling transfer function of an optical storage servo system according to one embodiment of the present invention.

FIG. 9 illustrates a block diagram of an apparatus for controlling transfer function of an optical storage servo system according to one embodiment of the present invention. The apparatus may include a control unit 901 and a memory 902. The control unit 901 may control various procedures of the optical storage servo system, including the procedures shown in FIGS. 5 and 8. The memory 902 may store a number of nominal plant gains $K_{nn}$ and a compensator $C_{nn}$ corresponding to each nominal plant gain. The control unit 901 may access the memory 902 during operation of the methods shown in FIGS. 5 and 8.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A method for calibrating gains of a storage servo system having a plant, the method comprising:
   translating a first signal of the plant from a time domain effort signal into a frequency domain effort signal;
   translating a second signal of the plant from a time domain error signal into a frequency domain error signal;
   determining a gain of the storage servo system based on the first signal and the second signal; and
   skipping calibration of the gain based on the first signal and the second signal when a third signal from a storage medium of the storage servo system drops below a predetermined threshold.

2. The method of claim 1, further comprising:
   providing a defect indication when the third signal drops below the predetermined threshold.

3. The method of claim 1, further comprising:
   comparing the third signal from the storage medium with the predetermined threshold.

4. The method of claim 1, wherein the first signal is translated using a Discrete Fourier Transformation (OFT).

5. The method of claim 1, wherein the second signal is translated using a Discrete Fourier Transformation (OFT).

6. The method of claim 1, further comprising:
   obtaining the first signal at an input of the plant; and
   obtaining the second signal at an output of the plant.

7. The method of claim 6, further comprising:
   determining a transfer function of the plant by calculating a ratio between the frequency domain error signal and the frequency domain effort signal.

8. The method of claim 7, further comprising:
   determining the first gain by calculating a magnitude of the transfer function.

9. The method of claim 6, further comprising:
   determining a second gain of the storage servo system at an outermost layer of the storage medium.

10. The method of claim 9, further comprising:
    determining a third gain of the storage servo system at the outermost layer with the first gain and the second gain at the outermost layer.

11. An apparatus for a storage servo system having a plant, the apparatus comprising:
    a memory for storing nominal plant gains; and
    a control unit coupled to the memory, the control unit configured to translate a first signal of the plant from a time domain effort signal into a frequency domain effort signal, translate a second signal of the plant from a time domain error signal into a frequency domain error signal, determine a first gain of the storage servo system based on the first signal and the second signal, and skip calibration of the first gain based on the first signal and the second signal when a third signal from a storage medium of the storage servo system drops below a predetermined threshold.

12. The apparatus of claim 11, wherein the control unit is further configured to provide a defect indication when the third signal drops below the predetermined threshold.

13. The apparatus of claim 11, wherein the control unit is further configured to compare the third signal from the storage medium with the predetermined threshold.

14. The apparatus of claim 11, wherein the control unit is further configured to translate the first signal using a Discrete Fourier Transformation (OFT).

15. The apparatus of claim 11, wherein the control unit is further configured to translate the second signal using a Discrete Fourier Transformation (OFT).

16. The apparatus of claim 11, wherein the control unit is further configured to obtain the first signal at an input of the plant, and obtain the second signal at an output of the plant.

17. The apparatus of claim 16, wherein the control unit is further configured to calculate a ratio between the frequency domain error signal and the frequency domain effort signal for determining a transfer function of the plant.

18. The apparatus of claim 17, wherein the control unit is further configured to calculate a magnitude of the transfer function for determining the first gain.

19. The apparatus of claim 16, wherein the control unit is further configured to determine a second gain of the storage servo system at an outermost layer of the storage medium.

20. The apparatus of claim 19, wherein the control unit is further configured to determine a third gain of the storage servo system at the outermost layer with the first gain and the second gain at the outermost layer.

* * * * *